(12) United States Patent
Nagler

(10) Patent No.: US 11,377,894 B2
(45) Date of Patent: Jul. 5, 2022

(54) DRIVE ARRANGEMENT FOR MOTORIZED ADJUSTMENT OF A CLOSURE ELEMENT OF A MOTOR VEHICLE

(71) Applicant: Brose Fahrzeugteile SE & Co. Kommanditgesellschaft, Bamberg, Bamberg (DE)

(72) Inventor: Toni Nagler, Bamberg (DE)

(73) Assignee: Brose Fahrzeugteile SE & Co. Kommanditgesellschaft, Bamberg, Bamberg (DE)

(*) Notice: Subject to any disclaimer, the term of this patent is extended or adjusted under 35 U.S.C. 154(b) by 156 days.

(21) Appl. No.: 16/823,646

(22) Filed: Mar. 19, 2020

(65) Prior Publication Data

US 2020/0300021 A1 Sep. 24, 2020

(30) Foreign Application Priority Data

Mar. 19, 2019 (DE) .................. 10 2019 107 024.4

(51) Int. Cl.
*E05F 15/611* (2015.01)
*H02P 23/18* (2016.01)

(52) U.S. Cl.
CPC ............ *E05F 15/611* (2015.01); *H02P 23/18* (2016.02); *E05Y 2201/434* (2013.01); *E05Y 2900/532* (2013.01)

(58) Field of Classification Search
CPC ...... H02P 1/00; H02P 1/04; H02P 1/16; H02P 1/163; H02P 1/18; H02P 1/22; H02P 1/24; H02P 1/26; H02P 1/265; H02P 1/40; H02P 1/42; H02P 1/46; H02P 1/465; H02P 3/00; H02P 3/025; H02P 3/04; H02P 3/06; H02P 3/12; H02P 3/16; H02P 3/18; H02P 3/22; H02P 3/26; E05F 15/611; E05F 15/41; E05Y 2201/4341; E05Y 2900/532
See application file for complete search history.

(56) References Cited

U.S. PATENT DOCUMENTS 7,288,907 B2 * 10/2007 Kamiya .................. B60J 5/06
318/446

FOREIGN PATENT DOCUMENTS

| DE | 102008057014 A1 | 5/2010 |
| DE | 102011112273 A1 | 3/2013 |
| DE | 102016119959 A1 | 4/2018 |

* cited by examiner

*Primary Examiner* — Antony M Paul
(74) *Attorney, Agent, or Firm* — Brooks Kushman, P.C.

(57) ABSTRACT

A drive arrangement for motorized adjustment of a closure element of a motor vehicle comprising a drive having an electric drive motor and comprising a drive control for actuation of the electric drive, wherein the drive arrangement is connected to a supply voltage, wherein the drive control may include a control unit and a driver unit which may be actuated by the control unit, wherein the driver unit is used for the electric supply of the drive motor to generate drive movements. The drive control may be brought into a holding state in which the driver unit operates in a holding mode, that the driver unit interacts with the drive motor in the holding mode to hold the closure element in an intermediate position and that the drive control has a supply switch which separates the driver unit in the holding state of the drive control from the supply voltage.

20 Claims, 2 Drawing Sheets

DRIVE ARRANGEMENT FOR MOTORIZED ADJUSTMENT OF A CLOSURE ELEMENT OF A MOTOR VEHICLE

CROSS-REFERENCE TO RELATED APPLICATIONS

This application claims priority to German Patent Application No. DE 10 2019 107 024.4, filed on Mar. 19, 2019, the disclosure of which is hereby incorporated in its entirety by reference herein.

TECHNICAL FIELD

The present disclosure relates to a drive arrangement for motorized adjustment of a closure element of a motor vehicle.

BACKGROUND

Vehicles may include closure elements such as tailgates, trunk lids, rear doors, front hoods, engine covers, side doors or the like of a motor vehicle. Such a closure element can be configured pivotably in the manner of a pivoting door, a pivoting flap or a pivoting cover or longitudinally moveable similar to a sliding door. These closure elements may be actuated by one or more drive arrangements.

SUMMARY

According to one embodiment, a drive arrangement that may include a drive control that may include a control unit and a driver unit that may be actuated by the control unit, is provided. The driver unit may provide electrical supply to the drive motor to produce drive movements. For example, the driver unit may include an H-bridge circuit.

In one or more embodiments, when the driver unit is in a holding state, for holding the closure element, the driver unit may hold the closure element even when the driver unit is disconnected from a supply voltage. Thus, even if an error occurs, such as an undesired contact between supply terminals and a supply potential or a ground potential the holding function may be achieved or maintained.

In one or more embodiments, the driver unit may change to a holding state so the driver unit operates in a holding mode. When in the holding state, the driver unit may interact with the drive motor in the holding mode to hold the closure element in an intermediate position and the drive control may have a supply switch which separates the driver unit in the holding state from the supply voltage.

The driver unit may change to the holding state so that the driver unit operates in the holding mode. During the holding mode, the driver unit operates independently of the supply voltage due to the drive unit being disconnected from the supply voltage. Accordingly, an error situation discussed above may not influence the holding function and the robustness of the drive arrangement may be extraordinarily high.

The present disclosure provides one or more systems and methods to transfer the driver unit to the holding mode. As an example, the control unit may connect the driver unit to control signals to trigger the holding mode. This may enable an adjustable or flexible setting of the holding mode by the control unit, for example depending on ambient conditions such as temperature, air humidity or the like.

In another embodiment, the driver unit automatically changes to the holding mode in response to the control unit being in a passive state. This may provide an error-robust behavior of the drive arrangement.

According to one or more embodiments, the holding mode may be achieved by the relevant drive motor being connected to a holding circuit and being in the holding state for generating the holding mode. The relevant drive motor and the holding circuit may be formed as a short circuit.

In one or more embodiments the driver unit may be provided with an H-bridge circuit. The use of an H-bridge circuit may provide an adjustable or a flexible actuation of the drive motor, such as a pulse-width-modulated actuation (PWM actuation).

In one or more embodiments, changing the control unit to the passive state may be accompanied by disconnecting the driver unit from the supply voltage. This may result in error robustness without requiring separate measures to actuate the supply switch.

The supply switch may be arranged both on the ground side of the driver unit and also on the supply potential side of the driver unit. For example, the high control-technology flexibility which may be achieved with the solution as claimed in the proposal is shown.

The embodiments provided herein may be applied to a drive arrangement that may not configured to be self-inhibiting. As such, a short-circuit braking of the drive motor discussed above may act directly on the closure element.

As an example, the drive arrangement may be fitted with several drives, such as two drives. The drive control may in each case include one driver unit for actuation of the drive motors of the drives. The driver units may then be operated as the holding mode. All the explanations for the drive apply accordingly to all other drives which are possibly provided.

The embodiments provided herein may be applied to a closure element arrangement of a motor vehicle.

As an example, the closure element arrangement may include a closure element and a drive arrangement for motorized adjustment of the closure element.

In one or more embodiments, the holding state has the effect that the drive arrangement holds the closure element in one or more intermediate positions. The drive arrangement may be configured so that, regardless of the intermediate position in which the closure element is located, a sufficient holding force acts on the closure element so that the closure element cannot move from the respective intermediate position driven by the weight force or by a spring force.

According to yet another embodiment, a method for actuating a drive arrangement is provided.

As one example, when the drive control is in the holding state, the driver unit may be operated in holding mode and may be disconnected from the supply voltage by the supply switch.

BRIEF DESCRIPTION OF THE DRAWINGS

The invention will be explained in detail with reference to a drawing showing merely one exemplary embodiment. In the drawings.

DETAILED DESCRIPTION

Figure 1:
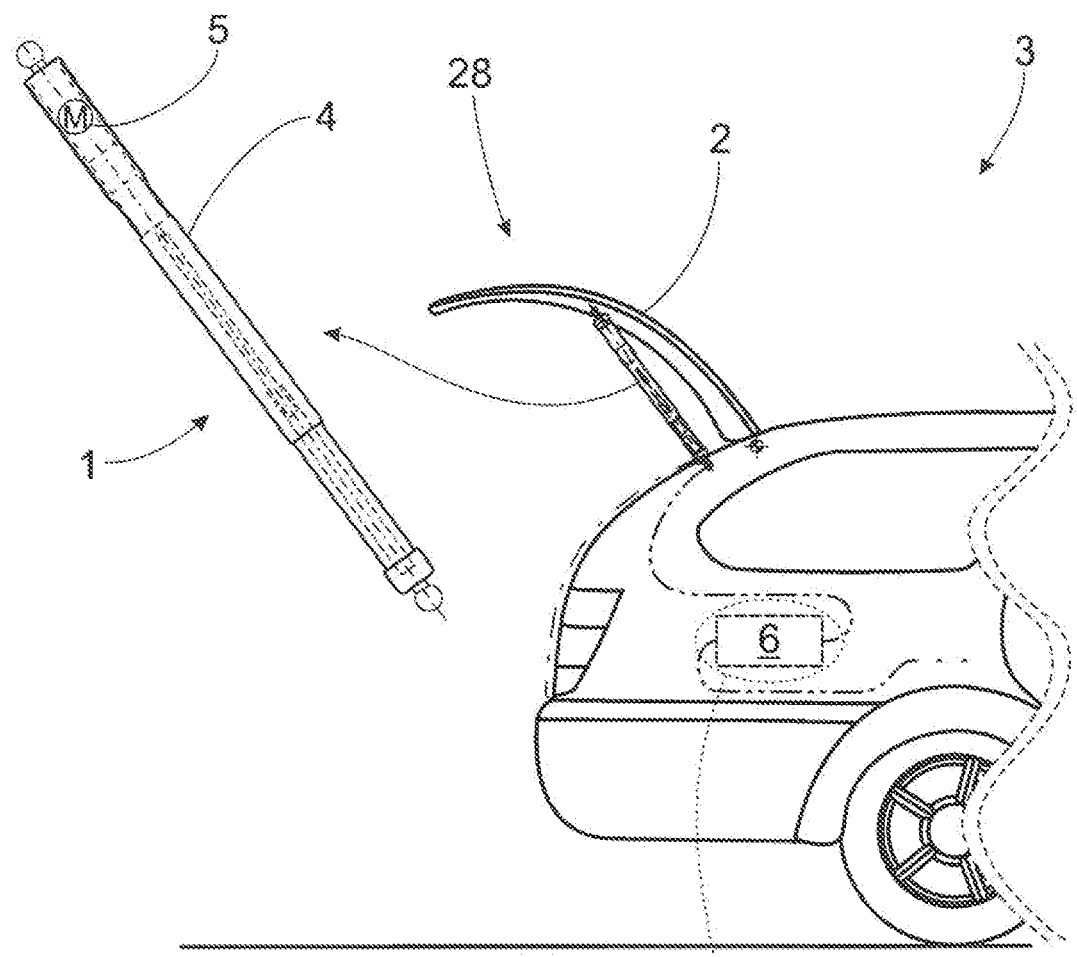
FIG. 1 shows the rear area of a motor vehicle with a closure element arrangement as claimed in the proposal which is assigned a drive arrangement as claimed in the proposal.
Figure 1:
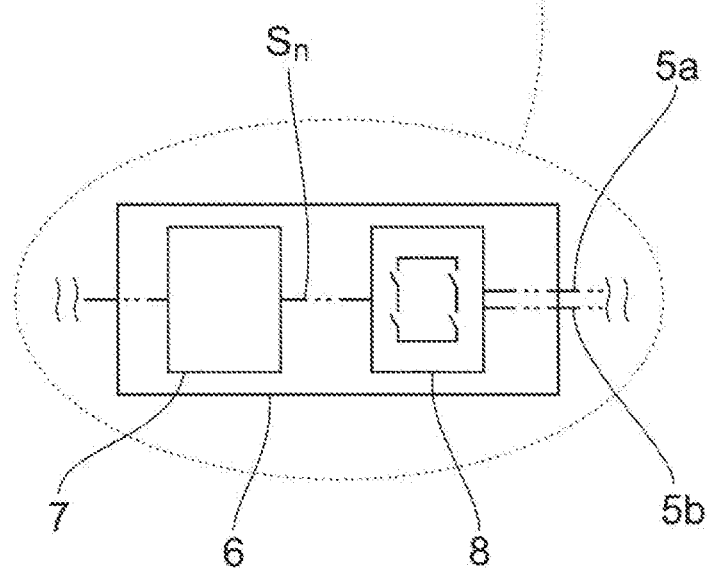

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "closure element" should be interpreted widely in the present case. This term includes tailgates, trunk lids, rear doors, front hoods, engine covers, side doors or the like of a motor vehicle. Such a closure element may be configured pivotably in the manner of a pivoting door, a pivoting flap or a pivoting cover or else longitudinally displaceable similar to a sliding door.

The drive arrangement in question is used for motorized adjustment of the closure element between a completely closed position and a completely opened position. A challenge here is holding the closure element in any intermediate positions. This relates, on the one hand, to the situation in which an operator intentionally approaches an intermediate position. This relates, on the other hand, to the situation in which the drive arrangement fails in an intermediate position. In both situations care should be taken to ensure that an adjustment of the closure element, mostly against the weight force of the closure element, is braked.

A known drive arrangement is provided in DE 10 2011 112 273 A1. The known drive arrangement describes braking the closure element when the associated drive motor is operated in generator mode. The drive motor then generates a charging current for the vehicle battery to a certain extent.

The known drive arrangement has proved successful for holding a closure element in an intermediate position primarily as a result of the low control-technology expenditure. A challenge remains in regard to the robustness in respect of specific error situations. Such an error situation is, for example, the undesired contacting of one of the supply terminals of the drive motor with the supply potential or the ground potential.

The present disclosure may address one or more problems associated error prone drive arrangements.

The drive arrangement 1 may be used for the motorized adjustment of a closure element 2 of a motor vehicle 3. In the present case, the closure element 2 is a tailgate of the motor vehicle 3. All relevant explanations apply accordingly to all other types of closure elements.

The drive arrangement 1 is assigned at least one drive 4, which may include an electric drive motor 5, and a drive control 6 for actuating the electric drive 4. As will be explained further, the drive arrangement 1 may have more than only one drive 4. All the explanations for the one drive 4 apply accordingly to all other drives which may be provided.

In the mounted state, the drive arrangement 1 is connected to a supply voltage $U_0$. The supply voltage $U_0$ may be electrical voltage that is provided by the vehicle battery and represents the potential difference between the supply potential $V_0$ and the ground potential. The ground potential is indicated by the designation "Gnd" in FIG. 2.

FIG. 1 shows that the drive control 6 may include a control unit 7 and a driver unit 8 which may be actuated by the control unit 7. The driver unit 8 is used for the electrical supply of the drive motor 5 to produce drive movements. The driver unit 8 therefore provides the drive motor 5 with the electrical power, which the drive motor 5 then converts at least partly into mechanical power. A circuitry view of the driver unit 8 may be seen from the diagram according to FIG. 2.

The control unit 7 may be brought into a holding state, in which the driver unit 8 operates in a holding mode, wherein the driver unit 8 in the holding mode interacts with the drive motor 5 to hold the closure element 2 in an intermediate position of the closure element 2 and wherein the drive control 6 has a supply switch 9, which separates the driver unit 8 in the holding state of the control unit 7 from the supply voltage $U_0$. The setting of the holding state may be attributed to a user input, which, according to the configuration, may be accompanied by a corresponding instruction to the drive control 6.

Figure 2:
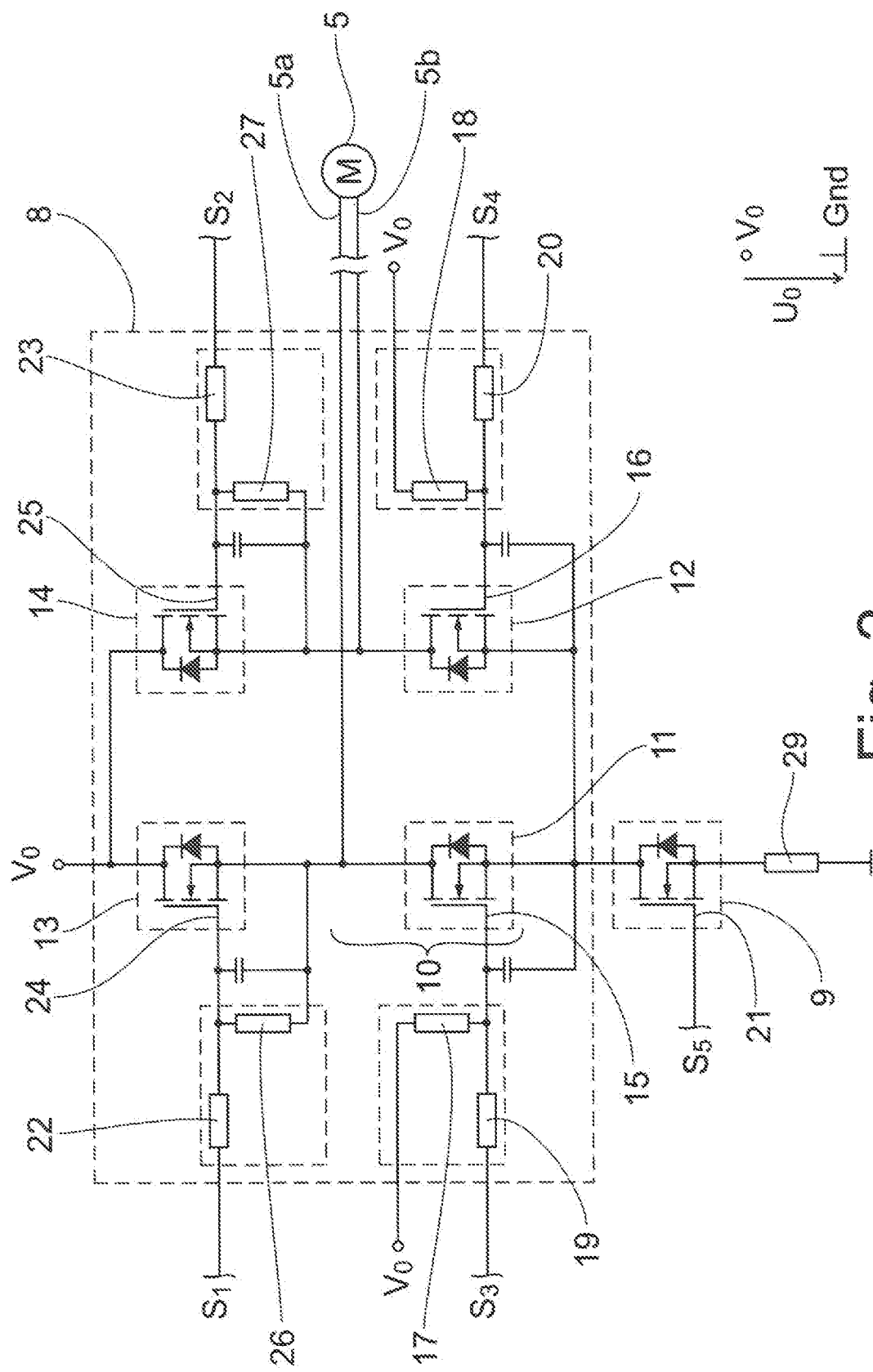
FIG. 2 shows the driver unit of the drive control of the drive arrangement according to FIG. 1 in circuitry view.

The diagram according to FIG. 2 shows the supply switch 9. Here it is clear that an opening of the supply switch 9 leads to a separation of the driver unit 8 from the supply voltage $U_0$.

In principle, the control unit 7 in the holding state may actuate the driver unit 8 to produce the holding mode in such a manner that the driver unit 8 interacts with the drive motor 5 to hold the closure element 2 in an intermediate position. This means that the control unit 7 produces control signals Sn which are causative for the generation of the holding mode of the driver unit 8. In FIG. 2 these control signals are the control signals $S_1$, $S_2$, $S_3$, $S_4$. This makes it possible to set the holding mode, for example depending on ambient conditions as discussed further above.

The driver unit 8 goes over automatically into the holding mode, such as when the actuation on the part of the control unit 7 is omitted. As an example, the control unit 7 may be brought into a passive state, in which the control unit 7 does not perform any actuation of the driver unit 8. The passive state may be defined so that the effect of the passive state on the driver unit 8 corresponds to the effect of separating the control unit 7 from the driver unit 8.

In one or more embodiments, the driver unit 8 is set up to operate in the holding mode when the control unit 7 is in the passive state. This means, for example, that a failure of the supply voltage $U_0$ has the result that the driver unit 8 operates automatically in the holding mode. In this case, it is accordingly assumed that, in the event of a failure of the supply voltage $U_0$, the control unit 7 goes over automatically into the passive state due to the lack of an electrical supply.

To produce the holding mode the drive motor 5 in the holding state is connected to a holding circuit 10 so that a holding current flows through the drive motor 5. This connection of the drive motor 5 is here and may be triggered by means of the control unit 7.

In detail, the holding circuit 10 may be configured as a short circuit via which the holding current flows. The holding of the closure element 2 is therefore attributable to a short-circuit braking of the driver motor 5.

In order to limit the holding current and as a result the holding force, the short circuit, here the holding circuit 10, may have a braking resistor via which the holding current flows in the holding mode (not shown).

FIG. 2 shows that the driver unit 8 may include an H-bridge circuit with two low-side switches 11, 12 and two high-side switches 13, 14 for actuating the drive 4, here for actuating the drive motor 5. It may be further deduced from the diagram according to FIG. 2 that the H-bridge circuit may include two half-bridges which each comprise one of the low-side switches 11, 12 and one of the high-side switches 13, 14. As an example, the low-side switches 11, 12 and the high-side switches 13, 14 are configured as field-effect transistors, in particular as MOSFETs. The switches 11-14 and the switch 9 may in each case n-channel field effect transistors. This is merely a question of the design. In principle here, p-channel field effect transistors may also be used.

The H-bridge circuit of the driver unit 8 may provide or form the holding circuit 10. As one example, the holding circuit 10 is assigned the two low-side switches 11, 12 or the two high-side switches 13, 14, and the control unit 7 may close the switches 11, 12; 13, 14 assigned to the holding mode in the holding state to close the holding circuit 10.

In the exemplary embodiment shown in FIG. 2, the holding circuit 10 is assigned the two low-side switches 11, 12. It may be deduced from the diagram according to FIG. 2 that a closing of the two low-side switches 11, 12 when the high-side switches 13, 14 are opened has the result that the supply terminals 5$a$, 5$b$ of the drive motor 5 are short-circuited so that the drive motor 5 is short-circuit braked. The holding current in a holding mode achieved in such a manner flows via the switches 11, 12 assigned to the holding mode, here the low-side switches 11, 12.

It may be further deduced from the diagram according to FIG. 2 that the gate terminals 15, 16 of the low-side switches 11, 12 are assigned pull-up resistors 17, 18 which ensure that when the control unit 7 is in the passive state, the respective gate potential reaches the switching potential to interconnect the low-side switches 11, 12. This means that the low-side switches 11, 12 in the passive state of the control unit 7 are always interconnected so that the holding mode of the driver unit 8 is set. In general, the switches assigned to the holding mode, here the low-side switches 11, 12, are closed when the control unit 7 is in the passive state. This has the result, for example, that a failure of the supply voltage $U_0$ automatically initiates the holding mode of the driver unit 8.

Conversely, it is the case that the supply switch 9 separates the driver unit 8 from the supply voltage $U_0$ when the control unit 7 is in the passive state. This in turn results from the diagram according to FIG. 2 since, when the control unit 7 is in the passive state, the control signal $S_5$ may not exceed the required switching potential at the gate terminal 21 of the supply switch 9 likewise configured as a field effect transistor.

The coupling resistors 19, 20, which provide a coupling between the signal inputs $S_3$ and $S_4$ with the respectively assigned gate terminals 15, 16 are several orders of magnitude lower than the pull-up resistors 17, 18 so that the actuation of the low-side switches 11, 12 via the control signals $S_3$ and $S_4$ is not adversely affected by the high-resistor pull-up resistors 17, 18. Such a pull-up circuit is known from the prior art.

The high-side switches 13, 14 are also coupled via coupling resistors 22, 23 to the relevant gate terminals 24, 25. Additionally, compensating resistors 26, 27 are provided, which ensure that in the holding mode the switching potential cannot be exceeded so that the high-side switches 13, 14 block in the holding mode. The compensating resistors 26, 27 are in turn several orders of magnitude greater than the coupling resistors 22, 23.

It should be pointed out that all the above explanations for the low-side switches 11, 12 fundamentally apply to the high-side switches 13, 14 if alternatively the high-side switches 13, 14 are assigned to the holding mode.

In the exemplary embodiment, the supply switch 9 may be arranged on the ground side of the driver unit 8. Fundamentally however, it may also be provided that the supply switch 9 is arranged on the supply potential side of the driver unit 8, in the drawing therefore between the supply potential $V_0$ and the drain terminals of the high-side switches 13, 14.

As an example, the drive 4 is not configured to be self-inhibiting so that a non-motorized adjustment of the closure element 2 brings about a back-driving of the drive motor 5. The non-motorized adjustment of the closure element 2 may, as discussed above, be attributable to the weight force of the closure element 2. Alternatively or additionally, it may be provided that the closure element 2 is assigned a spring arrangement not shown, which brings about such a non-motorized adjustment of the closure element 2.

It has already been pointed out that the drive arrangement 1 as claimed in the proposal may have more than one drive 4. Here and preferably it is provided that two drives 4 are provided, wherein the drive control 6 for actuating the drive motors 5 of the drives 4 may include in each case one driver unit 8, here and preferably an H-bridge circuit. In a particularly preferred configuration, the further drive is actuated in an identical manner to the first-mentioned drive 4. In this respect, reference may be made to all the explanations for the actuation of the first-mentioned drive 4.

In one or more embodiments, the arrangement is affected so that the holding state has the effect that the drive arrangement 1 holds the closure element 2 in each intermediate position. Essential here is a corresponding matching to one another of the weight force of the closure element 2, possible spring forces and the holding effect in the holding state.

In one or more embodiments, when the drive control 6 is in the holding state, the driver unit 8 may be operated in the holding mode and be disconnected from the supply voltage $U_0$ by means of the supply switch 9.

As an example, for setting the holding mode by means of the control unit 7, the control signals $S_3$ and $S_4$ assigned to the low-side switches 11, 12 are either actuated with positive potential or not at all so that the low-side switches 11, 12 interconnect. At the same time, the control signal $S_5$ is actuated with ground potential or not at all so that the supply switch 9 opens and thus separates the driver unit 8 from the supply voltage $U_0$. This corresponds to the holding mode of the driver unit 8 discussed above.

Finally, it is again pointed out that the diagram according to FIG. 2 shows a resistor 29, which here and preferably serves as a shunt resistor for measurement of the respective drive current. For the solution as claimed in the proposal, the shunt resistor 29 plays a subordinate role.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive arrangement configured to provide motorized adjustment of a motor vehicle closure element, the drive arrangement comprising:
    an electric drive provided with,
        an electric drive motor, and
        a drive control configured to actuate the electric drive, and including a control unit,
            a driver unit configured to be actuated by the control unit, wherein the driver unit is configured to provide electric supply to the electric drive motor; and
    a supply switch, wherein when the drive arrangement is in a mounted state, the drive arrangement is connected to a supply voltage,
wherein the drive control is configured to change to a holding state so that the driver unit operates in a holding mode, wherein when the drive control is in the holding state, the driver unit operates in the holding mode so that the driver unit sends signals to the drive motor to hold the closure element in an intermediate position, and wherein the supply switch is configured to disconnect the driver unit from the supply voltage when the drive control changes to the holding state.

2. The drive arrangement of claim 1, wherein the control unit is configured to, responsive to being in the holding state, actuate the driver unit to send second signals to the drive motor to hold the closure element in the intermediate position.

3. The drive arrangement of claim 1, wherein the control unit is configured to, responsive to being in a passive state, not actuate the driver unit so that the control unit is electrically disconnected from the driver unit.

4. The drive arrangement of claim 3, wherein the driver unit is configured to operate in a holding mode in response to the control unit being in the passive state.

5. The drive arrangement of claim 1, further comprising a holding circuit connected to the control unit, wherein when the drive motor is in the holding state, the drive motor receives a holding current for the holding circuit.

6. The drive arrangement of claim 5, wherein the holding circuit is formed by a short circuit having a braking resistance.

7. The drive arrangement of claim 6, wherein the H-bridge circuit includes a first half bridge and a second half-bridge, wherein the first half bridge includes the first-low side switch and the first high-side switch which each have one of the low-side switches and one of the high-side switches.

8. The drive arrangement of claim 7, wherein the first and second low-side switches and the first and second high-side switches are MOSFETs.

9. The drive arrangement of claim 1, wherein the driver unit includes an H-bridge circuit provided with a first low-side switch and a second low-side switch and a first high-side switch and a second high-side switch each configured to actuate the drive.

10. The drive arrangement of claim 9, wherein the first and second low-side switches or the first and second high-side switches are provided in the holding circuit and wherein control unit is configured to, responsive to being in the holding state, close at least one of the switches of the first and second low-side switches or of the first and second high-side switches, to close the holding circuit.

11. The drive arrangement of claim 10, wherein when the first and second low-side switches are closed, the first and second high-side switches are open and holding current flows through the switches assigned to the holding mode.

12. The drive arrangement of claim 10, wherein the control unit is configured to, responsive to being in a passive state, close at least one of the switches of the first and second low-side switches or of the first and second high-side switches.

13. The drive arrangement of claim 12, further comprising a supply switch configured to disconnect the driver unit from the supply voltage when the control unit is in the passive state.

14. The drive arrangement of claim 13, wherein the supply voltage is based on a potential difference between a supply potential and a ground potential, and wherein the supply switch is arranged on a ground side of the driver unit or a supply potential side of the driver unit.

15. The drive arrangement of claim 1, wherein the drive is configured so that during a non-motorized adjustment of the closure element the drive motor back-drives.

16. A drive arrangement configured to provide motorized adjustment of a closure element coupled to a vehicle body, the drive arrangement comprising:
a motor configured to actuate the drive arrangement;
a control unit;
a driver unit configured to receive current from an electrical supply and provide the current to the motor, wherein the driver unit is configured to operate in a holding state, in which the driver unit sends signals to the motor to hold the closure element in an intermediate position; and
a supply switch, wherein the supply switch is configured to disconnect the driver unit from the electrical supply in response to the driver unit being in the holding state.

17. The drive arrangement of claim 16, wherein the driver unit includes an H-bridge circuit, wherein the H-Bridge circuit is configured adjust a pulse-width-modulation cycle of the motor in response to the driver unit being in the holding state.

18. The drive arrangement of claim 16, wherein the driver unit is configured to operate in the holding state in response to an ambient temperature received by the control unit.

19. The drive arrangement of claim 16, wherein the driver unit is configured to operate in the holding state in response to a measured humidity received by the control unit.

20. A method of actuating a drive arrangement configured to provide motorized adjustment of a closure element coupled to a vehicle body, the method comprising:
changing a state of a drive control to a holding state so that a driver unit operates in a holding mode, in which the driver unit sends signals to a drive motor to hold the closure element in an intermediate position;
disconnecting, by a supply switch, the driver unit from supply voltage, in response to the drive control changing to the holding state.

* * * * *